United States Patent
Zolotov

(10) Patent No.: US 8,500,023 B2
(45) Date of Patent: Aug. 6, 2013

(54) SYSTEM AND METHOD FOR PROVIDING SUFFICIENT ILLUMINATION QUALITY FOR BARCODES CAPTURED WITH A COLOR IMAGE SENSOR

(75) Inventor: Serguei Zolotov, Ottawa (CA)

(73) Assignee: Psion Inc., Mississauga, Ontario (CA)

( * ) Notice: Subject to any disclaimer, the term of this patent is extended or adjusted under 35 U.S.C. 154(b) by 0 days.

(21) Appl. No.: 13/316,977

(22) Filed: Dec. 12, 2011

(65) Prior Publication Data

US 2012/0312877 A1    Dec. 13, 2012

Related U.S. Application Data

(63) Continuation-in-part of application No. 13/034,206, filed on Feb. 24, 2011, now Pat. No. 8,079,525, and a continuation-in-part of application No. 13/299,596, filed on Nov. 18, 2011.

(51) Int. Cl.
G06K 7/00    (2006.01)
G06K 19/08    (2006.01)

(52) U.S. Cl.
USPC .................................................. 235/462.04

(58) Field of Classification Search
USPC ........................................ 235/462.01–462.49
See application file for complete search history.

(56) References Cited

U.S. PATENT DOCUMENTS

| | | | |
|---|---|---|---|
| 6,375,075 B1 * | 4/2002 | Ackley et al. | 235/462.04 |
| 6,832,725 B2 * | 12/2004 | Gardiner et al. | 235/462.21 |
| 7,028,901 B2 * | 4/2006 | Carlson | 235/462.04 |
| 8,079,525 B1 | 12/2011 | Zolotov | |
| 2003/0112471 A1 | 6/2003 | Damera et al. | |
| 2004/0199427 A1 | 10/2004 | van der Loo | |
| 2007/0138286 A1 | 6/2007 | Kamijoh et al. | |
| 2008/0265036 A1 | 10/2008 | Wichers | |
| 2010/0282851 A1 | 11/2010 | Bulan et al. | |
| 2011/0007967 A1 | 1/2011 | Soderberg et al. | |
| 2012/0000983 A1 | 1/2012 | Bhagwan et al. | |
| 2012/0118969 A1 | 5/2012 | Zolotov | |
| 2012/0145779 A1 | 6/2012 | Bietenbeck et al. | |
| 2012/0298753 A1 | 11/2012 | Zolotov | |

OTHER PUBLICATIONS

Wikipedia.org website; "Spectral sensitivity"; http://en.wikipedia.org/wiki/Spectral_sensitivity; May 11, 2008.
Non Final Office Action mailed on Mar. 26, 2012 in related U.S. Appl. No. 12/944,327, Serguei Zolotov, filed Nov. 11, 2010.
Final Office Action mailed on Oct. 2, 2012 in related U.S. Appl. No. 12/944,327, Serguei Zolotov, filed Nov. 11, 2010.

(Continued)

Primary Examiner — Daniel Hess

(57) ABSTRACT

A barcode scanner device for reading a target barcode having a plurality of feature sections in a first color and a plurality of background sections in a second color. The device comprises: a light source for providing incident illumination onto the target barcode during reading of the target barcode, the light source having a plurality of independently selectable color wavelengths; a photodetector for receiving at least a portion of the incident illumination when reflected off the target barcode as reflected illumination, the reflected illumination used by the photodetector to capture a first color image of the target barcode when a first color wavelength is selected as the incident illumination and to capture a second color image of the target barcode when a second color wavelength is selected as the incident illumination.

14 Claims, 5 Drawing Sheets

OTHER PUBLICATIONS

Notice of Allowance mailed on Aug. 19, 2011 in counterpart U.S. Appl. No. 13/034,206, Serguei Zolotov, filed Feb. 24, 2011.
Non Final Office Action mailed on Nov. 13, 2012 in counterpart U.S. Appl. No. 13/299,596, Serguei Zolotov, filed Nov. 18, 2011.
"Color Selection for Barcode Symbols," Bar Code Graphics, Inc., pp. 2, accessed at http://www.barcode-us.com/upc/upcColorChart.html, accessed on Jan. 23, 2013.

* cited by examiner

SYSTEM AND METHOD FOR PROVIDING SUFFICIENT ILLUMINATION QUALITY FOR BARCODES CAPTURED WITH A COLOR IMAGE SENSOR

FIELD

The present disclosure relates generally to illuminating and decoding barcodes captured with a color image sensor. More particularly, the disclosure relates to determining sufficient illumination quality for barcodes captured with a color image sensor.

BACKGROUND

Barcode symbols provide a fast and accurate means of representing information about an object. Decoding or reading a barcode is accomplished by translating the patterns of the barcode, such as bars and spaces in linear barcodes or blocks or other features in a 2D barcode, into the corresponding numbers or characters. Barcodes are widely used for encoding information and tracking purposes in retail, shipping and industrial settings.

Historically, linear barcodes were optimized to be read by a laser scanner that sweeps a beam of light across the barcode, reading a slice of the pattern of the barcode. More recently, imagers (using image sensors such as CMOS or CCD devices) that capture a greyscale image have been used to read barcodes since they do not require moving parts like laser scanners and are also able to read 2D bar codes. However, image sensor technology is largely driven by the mass consumer camera market, rather than by barcode readers, where the trend is towards color image sensors with continually increasing resolutions and sensitivities delivered at lower costs. It may be advantageous for barcode reader technology to incorporate these color image sensors.

Often, only monochrome barcodes, typically black and white, are used due to their robustness in uncontrolled operating environments. These monochrome barcodes are typically printed on consumer products as a white rectangle with a black barcode thereon and can interfere with the design aesthetics of the packaging.

While color barcodes could be used to increase the aesthetic appeal, using a greater multitude of colors introduces errors that can negatively affect the robustness of barcode reading. Color barcodes pose difficult problems for either designing readable color barcodes or robust barcode readers that can decode these color barcodes. When the colors used for the features of the barcode and the background have a similar brightness, traditional greyscale-based barcode decoders and/or decoding techniques that rely on the brightness differences are not able to accurately decode these color barcodes.

Appropriate illumination of barcodes during image capture by the color image sensor can be critical in the resultant barcode image quality. In the case of color barcodes, the type of illumination used can affect the ability of the decoding process to correctly differentiate between different colors present in the color barcodes, which can negatively affect appropriate edge detection and subsequent readability of the barcodes.

SUMMARY

It is an object of the present invention to provide a system and method for illumination of color barcodes that obviates or mitigates at least one of the above-presented disadvantages.

According to a first aspect, a method is provided for reading a target barcode having a plurality of feature sections in a first color and a plurality of background sections in a second color. The method comprises: selecting a first color wavelength and a second color wavelength from a plurality of independently selectable color wavelengths for use as incident illumination, such that the second color wavelength is different from the first color wavelength; directing incident illumination onto the target barcode during reading of the target barcode using the first color wavelength to capture using a photodetector a first color image of the target barcode; directing incident illumination onto the target barcode during reading of the target barcode using the second color wavelength to capture using the photodetector a second color image of the target barcode; sending the first color image and the second color image to decoder system for image processing; receiving from the decoder system a first analysis result of the first color image and a second analysis result of the second color image and comparing the analysis results against an analysis threshold in order to determine a resultant captured image data.

According to a second aspect, a barcode scanner device is provided for reading a target barcode having a plurality of feature sections in a first color and a plurality of background sections in a second color. The device comprises: a light source for providing incident illumination onto the target barcode during reading of the target barcode, the light source having a plurality of independently selectable color wavelengths; a photodetector for receiving at least a portion of the incident illumination when reflected off the target barcode as reflected illumination, the reflected illumination used by the photodetector to capture a first color image of the target barcode when a first color wavelength is selected as the incident illumination and to capture a second color image of the target barcode when a second color wavelength is selected as the incident illumination; a memory for storing program code; and a processor coupled to the memory that executes the program code to configure the processor to select the first color wavelength and the second color wavelength from the plurality of independently selectable color wavelengths for use as the incident illumination, such that the second color wavelength is different from the first color wavelength.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computer can be a mobile computing device having a processor, a color image sensor for capturing barcode images, and at least one network interface. Program code may be executed by the processor to operate on input data, such as the captured barcode image, to perform the functions described herein and generate output data.

Figure 1A:
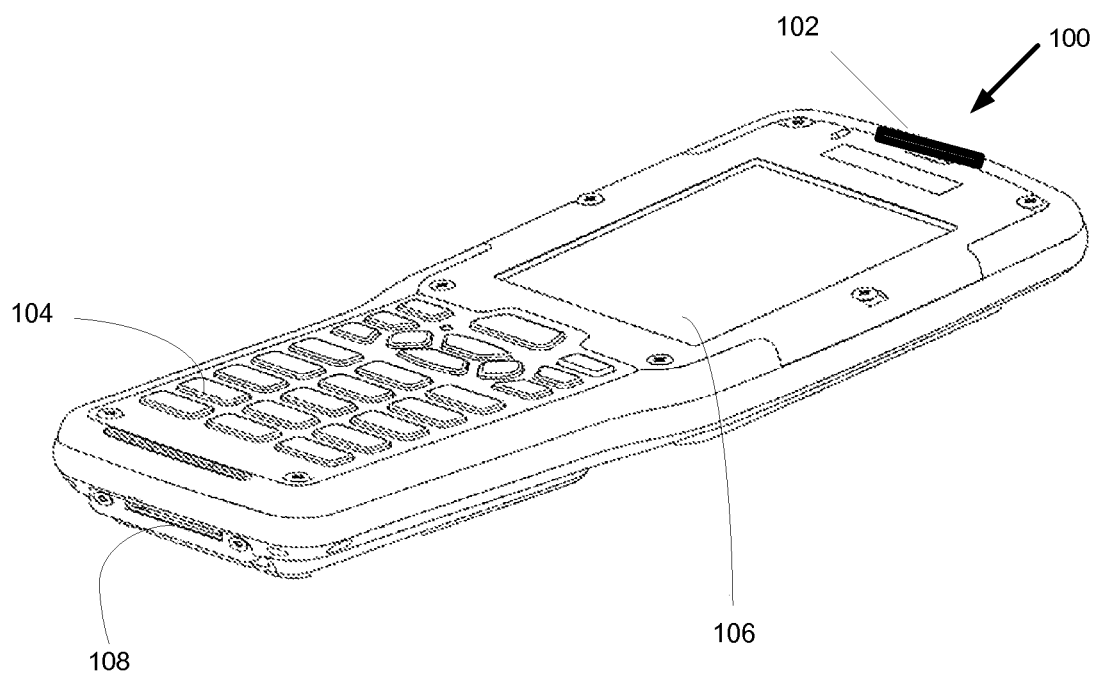
FIG. 1A is a perspective view of a computing device having a barcode scanner for optical barcode scanning.
Figure 1B:
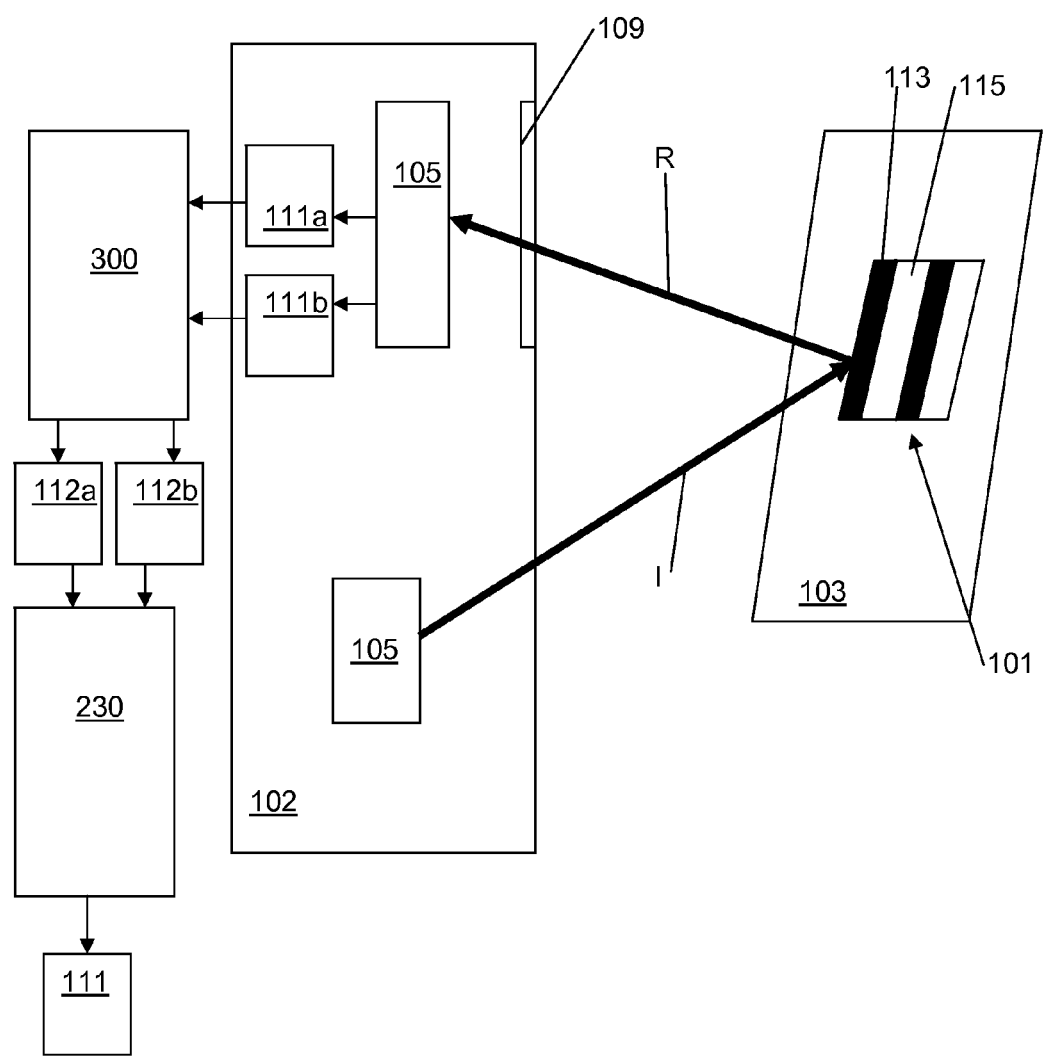
FIG. 1B is a block diagram of an exemplary architecture of functional subsystems of the barcode scanner of FIG. 1A.

Reference is first made to FIG. 1A and FIG. 1B, where a computing device 100, having a barcode scanner 102 for optical barcode scanning functionality, is shown. Barcode scanner 102 is an electronic device for reading barcodes 101 applied to, or otherwise formed in, a surface or substrate 103. Substrate 103 can be, for example, product packaging such as but not limited to paper or plastic wrapping. Barcode scanner 102, as described in further detail below, may comprise a set of hardware, firmware, and system software, employed in any suitable combination in order to capture color images of barcodes 101 using a photosensor as a color image sensor and one or more light sources 105 for illuminating barcodes 101 during image capture.

It is recognized that barcodes 101 may not contain descriptive data, rather barcodes 101 can be used as a reference number (e.g. decoded barcode information) that a computer uses to look up an associated record that contains the descriptive data and other important information about the product or item associated with barcode 101. For example, the matching item record can contain a description of the product, vendor name, price, quantity-on-hand, etc., which is typical for most 1D barcodes. However, some barcodes can contain, besides reference ID, additional or supplemental information such as product name or manufacturer, for example, and some 2D barcodes may contain even more information as they can be more informationally dense due the greater variation potential of the printed patterns over those of 1D barcodes.

Decoder 304 circuitry and/or software (see FIG. 3) is used to recognize and/or to make sense of edges (e.g. bars and spaces for 1D barcodes) between feature 113 (e.g. bar) and background 115 (e.g. spaces) sections that make up barcode 101. Decoder 304 translates the bars and spaces into corresponding electrical output in a traditional data format. In order to decode the information in barcode 101, for example for 1D barcodes, the widths of the bars and spaces are recognized via edge detection and their widths measured. Barcode scanner 102 can either have decoder 304 built in or can use a separate box called an interface or keyboard wedge.

Computing device 100 incorporating barcode scanner 102 can be any of a wide range of digital devices including, without limitation, devices which generate digital information, such as computer terminals, RFID readers, optical scanning devices, including dedicated barcode scanning devices, digital photo and document scanners. Computing device 100 can be implemented as either a fixed device, such as those used in retail sales, or a portable device, such as a mobile computer, mobile phone, handheld terminal, digital camera, scanner or other electronic device configured to capture and decode barcode images. Computing device 100 can further include a keyboard 104 for user input, a display screen 106, and an expansion port 108. An exemplary expansion port 108 can include a Universal Serial Bus (USB) port or other similar expansion port for coupling compatible peripheral devices such as, but not limited to, a communication and synchronization cradle for computing device 100.

Figure 3:
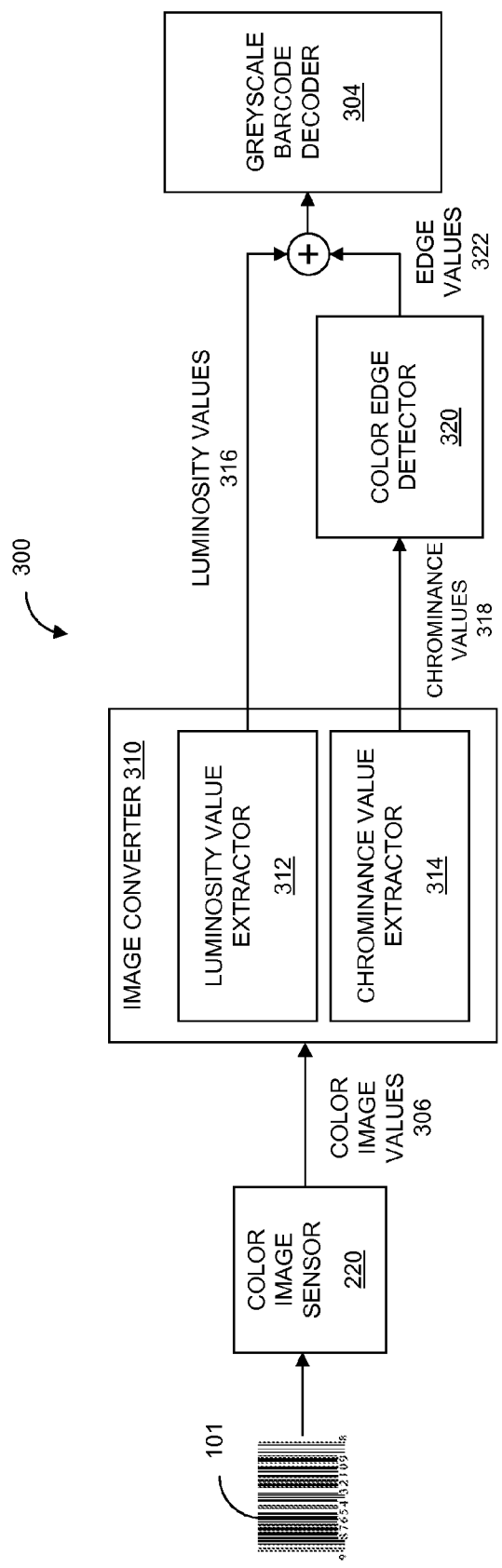
FIG. 3 is a block diagram of a system for decoding information captured from a target barcode with a color image sensor using a greyscale barcode decoder and FIG. 4 is a flowchart of an example operation of the barcode scanner of FIG. 2.

Referring now to FIG. 3, a block diagram 200 is shown illustrating an exemplary system architecture of the functional subsystems of computing device 100. Computing device 100 comprises a processor 202 that controls general operation of computing device 100. Processor 202 interacts with functional device subsystems, which can include subsystems such as barcode scanner 102 with associated light sources 105, image sensor(s) 107, display screen 106, flash memory 204, random access memory (RAM) 206, auxiliary input/output (I/O) subsystems 208, serial port 210, keyboard 104, speaker 212, short-range communications subsystem 214, such as Bluetooth™ for example, and expansion port 108. Computing device 100 can include a power source such as battery module 216 that can be removable and replaceable from computing device 100. While the illustrated embodiment of computing device 100 includes the functional subsystems described above, it will be apparent to those of skill in the art that device 100 can omit some of these susbsystems and/or can include additional subsystems as required to meet an intended field of use for computing device 100.

Computing device 100, which can be a handheld device, can have the capability of communicating at least data, and possibly any of data, audio and voice communications, to and from computing device 100, as well as data acquisition sources within a communication network. Computing device 100 can include wired or wireless communication capability. In the wireless configuration, the computing device 100 typically includes radio frequency (RF) communication subsystem 214, which includes a receiver, a transmitter, and associated components, such as one or more embedded or internal antennae, and a processing module such as a digital signal processor (DSP) or the like. As will be apparent to those skilled in field of communications, the particular design of RF communication subsystem 214 depends on the specific communication networks in which computing device 100 is intended to operate, and can include communication functionalities such as radio-frequency identification (RFID), Wi-Fi WLAN based on IEEE 802.11 standards, Zigbee, Z-Wave, GSM EDGE, 1EVDO, HSPDA, and the like.

Still with regard to FIG. 2A, operating system software that is executed by processor 202 can be stored in a persistent storage such as flash memory 204, or alternatively, in other read-only memory (ROM) or similar storage elements (not shown). Those skilled in the art will appreciate that the operating system, specific device applications, or parts thereof, may be temporarily loaded into a volatile store such as RAM 206. Processor 202, in addition to its operating system functions, enables execution of software applications on computing device 100. A predetermined set of applications, which control basic device operations, or even more customized, advanced device operations, may be installed on computing device 100 during its manufacture, such as during the components configuration process described herein. Display screen 106 of computing device 100 may be used to visually present a software application's graphical user interface (GUI) to a user via display screen 106, including results of the barcode capture process, i.e. captured image data 111. Display screen 106 can employ a touch screen display, in which case the user can manipulate application data by modifying information on the GUI using direct touches by a finger or stylus. Depending on the type of computing device 100, the user may have access to other types of input devices, such as, for example, a scroll wheel, trackball or light pen. A graphical user interface presented on display screen 106 of computing device 100 may enable an operator or administrator to interact therewith. It further contemplated that computing device 100 may be communicatively coupled to a remotely located database (not shown).

Referring to FIG. 1B, barcode scanner 102 can comprise any suitable combination of software, firmware and hardware to implement scanning of a target color barcode 101 with photosensor 107 (see FIG. 1B) performing as a color image sensor via a greyscale barcode decoding technique, as further described below. Barcode scanner 102 includes: the plurality of light sources 105 for emitting electromagnetic radiation as incident illumination I towards barcode 101; one or more photodetectors or photosensors, hereafter referred to as photosensors 107, that are configured for translating optical impulses into electrical ones in order to sense electromagnetic radiation as reflected illumination R representing the reflected portion of incident illumination I off of barcode 101; and optionally an optical lens 109, such that lens 109 can be adjustable (e.g. automatically, semi-automatically or manually) to focus reflected illumination R from barcode 101 onto photosensor 107. Photosensor 107 can be part of computing device 100 such as a digital still camera or a video camera, as desired.

It is noted that although a single photosensor 107 is discussed herein, photosensor 107 may comprise a number of sensors as may be needed to capture and process an image of a target barcode. For example, in one embodiment, different photosensors 107 may be used to process 1D, or 2D barcodes respectively. In another embodiment, a number of photosensors 107 can be used simultaneously to scan the target barcode and provide RGB values and/or YUV values as desired. In yet another embodiment, a number of photosensors 107 may be used such that each may be better suited for providing a particular type of color schemes (e.g. RGB or YUV or Bayer format as predefined) of the target barcode.

Photosensor 107 captures a particular barcode by illuminating, via appropriately selected light source 105, target barcode 101 and measuring the intensity of the light reflected back as reflected illumination R. The light source 105 can approximate white light, thus providing an example combination of color wavelengths for incident illumination I, or be a non-white light source such as a colored LED providing a single or limited number of selected color wavelengths for incident illumination I. A particular color or sequence of colors may be selected through appropriate selection of light source 105, as further described below, when there is a priori knowledge of the target barcode in order to enhance contrast between the feature 113 sections and background 115 sections. Further, appropriate selection of wavelength(s) emitted by light source 105 can be performed by barcode scanner 102 to result in a number of different captured image data 111a,b using differing selected color wavelengths of incident illumination I, which can then be matched against an image or decoding quality threshold 232 in order to determine the optimum captured image data 111 (e.g. the captured image data 111 having the best match to a standard barcode definition). Colored LEDs may also provide improved output per power.

Photosensor 107 can include a color filter array that covers the sensor elements, so that each sensor element is filtered to record only a single color. One such filter array is a Bayer filter that uses a weighted pattern of red, green and blue filter elements. The raw output in the Bayer filter format must then be processed by a de-mosaicing algorithm to interpret a set of red, green and blue values for each picture element, or pixel, of the captured image. The intensity of red, green and blue values for each pixel can be encoded into an RGB format image.

Conversion from raw output in the Bayer filter format can be performed by bar code scanner 102 implementing the de-mosaicing algorithm. Photosensor 107 can output the captured image data 111 in a number of different formats such as, for example, raw Bayer filter format, RGB, CMY, CMYK, HSC, YUV, or a processed image, including, but not limited to, JPEG. Barcode scanner 102 can also convert the image format from the raw Bayer filter format to any one of the aforementioned formats.

In an RGB format image, the color of each pixel is represented by the amount of red, green and blue colors that it includes. For example, within image formats such as BMP, JPEG and TIFF formats, each pixel of the image is represented with values for each of red, green and blue quantities. As is known in the art, other color spaces can also be used, such as, for example, the CMYK color space that uses four colors to define the color of each pixel.

Typically, a YUV model defines a color space in terms of one of a luminance, or luma, component (e.g. representing the brightness) as Y and chrominance (color) components as U and V. Luminance refers to perceptual brightness while "luma" is an electronic (voltage of display) brightness. The Y value described herein can refer to either one of luminance or luma values. Chrominance is usually represented as two color-difference components: U=B−Y (blue−luma) and V=R−Y (red−luma). Each of these color difference components may have applied scaling factors and offsets.

Further, barcode scanner 102 can contain decoder 304 circuitry and software (see FIG. 3) configured for analyzing captured image data 111 provided by photodetector 107 and sending results of the analysis to the scanner's output port, e.g. serial port 210, and/or directly to display screen 106 (see FIG. 2A).

It is recognized that incident illumination I of light source 105 can be visible light, infrared light (IR), ultraviolet (UV) light or a combination thereof, consisting of one or more individual wavelengths (i.e. a single wavelength light source 105 can be referred to as a laser). Visible light can be defined as electromagnetic radiation that is visible to the human eye and has a wavelength in a range from about 380 nm to about 740 nm. IR light can be defined as electromagnetic radiation with a wavelength longer than that of visible light, measured from the nominal edge of visible red light about 740 nm and extending conventionally to about 300000 nm. UV light can be defined as electromagnetic radiation with a wavelength shorter than that of visible light, but longer than X-rays, in the range 10 nm to about 380 nm. In terms of reflected illumination R, in the photoelectric effect, electrons (also referred to as photoelectrons or photons) are emitted from barcode 101 as a consequence of the absorption of energy obtained from incident illumination I. As further described below, selection of one or more of light sources 105, each having differing wavelength(s) or colors of incident illumination I, is dependent upon the colors (i.e. color scheme) used in forming feature 113 and background 115 sections of color formatted barcodes 101. It is recognized that appropriate sensing of feature 113 and background 115 sections by photosensor 107 can be facilitated by selection of light source 105 of appropriate wavelength(s) deemed compatible with the color scheme used in forming feature 113 and background 115 sections of barcode 101, as further described below. It is also recognized that light source 105 can be provided as a single light source 105 configured to emit a plurality of different wavelengths or colors of incident illumination I.

Photosensor 107 includes devices that capture and convert an optical image of barcode 101 present in reflected illumination R into an electronic signal representative of the plurality of feature 113 and background 115 sections present in barcode 101. It is recognized that additional circuitry (not shown) associated with photosensor 107 can convert electronic signal into digital data. It is recognized that the electronic signal (i.e. analog data) or the digital data are hereafter referred to as captured image data 111. Present photosensor 107 devices are capable of functioning in visible, near ultraviolet band and near infrared band of incident illumination I and can be any of a wide range of devices including, without limitation analog sensors and/or digital sensors such as digital charge-coupled device (CCD) or complementary metal-oxide-semiconductor (CMOS) active pixel sensors that are suitable for capturing colour images of barcode 101 represented as captured image data 111.

Other examples of photosensor 107 devices suitable for capturing reflected illumination R from barcode 101 include devices such as but not limited to: single photodiode or a collection of photodiodes which can operate in photovoltaic mode or photoconductive mode and are capable of converting light into either current or voltage, depending upon the mode of operation, such that the material used to make the photodiode(s) defines its operational properties since only photons with sufficient energy to excite electrons across the photodiode material's band gap will produce significant photocurrents; one or more Light Emitting Diodes (LEDs) reverse-biased to act as photodiodes; one or more optical detectors which are mostly quantum devices in which an individual photon produces a discrete effect; photo resistors or Light Dependent Resistors (LDR) which change resistance according to light intensity; one or more phototransistors which act like amplifying photodiodes; and one or more quantum dot photoconductors or photodiodes which can handle wavelengths in the visible and infrared spectral regions. It is recognized that different types of photosensors 107 can be used together, as desired, in order to detect the barcode 101 and/or in order to capture the barcode 101 either before detection or after detection.

As further described below, photosensor 107 can be used to facilitate measurement of the intensity of reflected illumination R from barcode 101. The intensity of reflected illumination R refers to the amount of reflected illumination R illuminating or "falling on" photosensor 107 and can be measured objectively. For example, photodiodes can be used for measurement of light intensity of reflected illumination R present in the captured image data 111.

Referring again to FIG. 1B, as used herein, the term barcode 101 refers to an optical machine-readable representation of information, presented as an ordered pattern of feature 113 and background 115 sections. For example, barcodes 101 can encode information in the widths and the spacing of parallel lines (e.g. feature 113 and background 115 sections), and may be referred to as linear or 1D (1 dimensional) symbologies. Barcodes 101 can also encode information in patterns of squares, dots, hexagons and other geometric shapes or symbols (e.g. feature 113 and background 115 sections) within images termed 2D (2 dimensional) matrix codes or symbologies. Typically, although 2D systems use symbols other than bars, they are generally referred to as barcodes 101 as well. Accordingly, barcode images (i.e. captured image data 111) discussed herein for use with barcode scanner 102 can refer to either 1D or 2D barcodes 101. As will be described, barcodes 101 can be read by optical scanners or readers referred to collectively as barcode scanners 102. As used herein, the objects used to encode the information, such as bars, squares, etc., are referred to as feature 113 sections and these feature 113 sections are printed or otherwise formed on background 115 sections. With conventional monochromatic barcodes 101, features are typically printed in black on a white background, thereby forming a pattern of feature 113 sections and background 115 sections that are used to form the machine-readable representation of information. With color barcodes 101, feature 113 sections can be any number of colors, as can background 115 sections, but feature 113 sections will be printed or formed such that the color(s) used for feature 113 sections are distinguishable from the color(s) used for background 115 sections during the barcode decoding process. Within this restriction, the actual colors of the feature 113 sections and background 115 sections may be selected based on aesthetic reasons. Further, it is recognized that appropriate selection of the one or more wavelengths of light source 105 used during barcode image capture can assist the barcode decoding process in providing better quality edge detection results by providing greater optical differentiation between the colors used in background 115 sections and feature 113 sections present in the captured image data 111.

Figure 2:
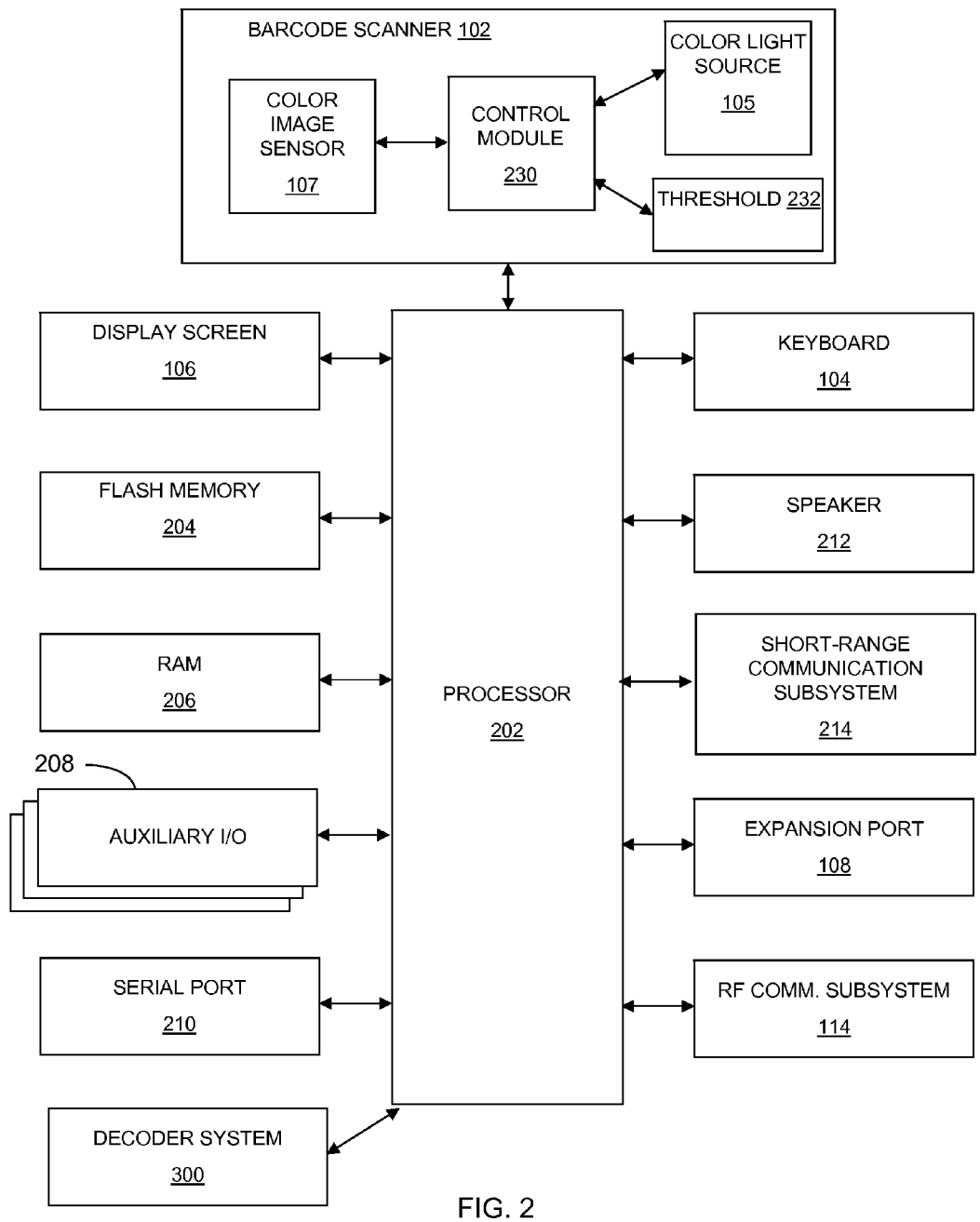
FIG. 2 is a block diagram illustrating an exemplary architecture of functional subsystems of the computing device of FIG. 1A.

Referring to FIG. 2, barcode scanner 102 comprises photodetector 107 capable of recording a color image of barcode 101, light source 105 for providing incident illumination onto the target barcode during reading of the target barcode 101 and having a plurality of independently selectable color wavelengths, and a control module 230 for operating light source 105 and photodetector 107 to capture a plurality of color images of barcode 101 using different ones of the plurality of independently selectable color wavelengths. Control module 230 is therefore connected to photodetector 107 and light source 105 and can be implemented as an integrated circuit, either a discrete unit or integrated with photodetector 107 or processor 202, or alternatively or in combination with, control module 230 can be implemented as software as program code stored in memory 205,206 executing on processor 202. Control module 230 can be implemented as hardware (e.g. integrated circuits) and/or as instructions stored in memory for execution by processor 202.

Control module 230 is configured to select the color wavelengths of the light source 105 that used by photodetector 107 as the incident illumination I for each of captured image data 111a,b, for example by selecting a first color wavelength used by photodetector 107 to capture a first color image of the barcode 101 and selecting a second color wavelength used by photodetector 107 to capture a second color image of the barcode 101. It is recognized, in terms of incident illumination I for the first and second color images, that the second color wavelength is different from the first color wavelength, wherein the first color wavelength can be a combination of individual color wavelengths (e.g. white light), the second color wavelength can be a combination of individual color wavelengths, the first color wavelength can be a single wavelength, the second color wavelength can be a single wavelength, or any reasonable combination thereof. It is also recognized that the second color wavelength can be included in a combination of color wavelengths of the first color wavelength or the first color wavelength can be included in a combination of color wavelengths of the second color wavelength. In any event, for purposes of operation of light source 105, the color wavelength(s) used to capture the first color image are different (e.g. different single wavelengths, different combinations of wavelengths, a single wavelength with a combination of wavelengths, etc.) from that/those used to capture the second color image.

One advantage in using respective different wavelengths (or wavelength combinations) for each of the respective first and second color images is that certain wavelength(s) may offer better quality (e.g. intensity) of reflected illumination R from the barcode 101, based on the colors used to form feature 113 and background 115 sections. For example, it is anticipated that a red light used as incident illumination I from light source 105 would be reflected with a greater intensity as reflected illumination R from feature 113 or background 115 sections formed in red, as compared to a yellow light used as incident illumination I.

A further advantage in using respective different wavelengths (or wavelength combinations) for each of the respective first and second color images is that certain wavelength(s) could provide for an increased level in the quality of edge detection between feature 113 and background 115 sections, based on the colors used to form feature 113 and background 115 sections. Suppose you have a barcode having feature 113 sections formed in red and background 115 sections formed in green. Considering brightness or intensity of reflected illumination R, red feature 113 sections would reflect red light wavelengths but absorb green light wavelengths, while green background 115 sections would reflect green light wavelengths but absorb red light wavelengths. It is understood that if we illuminate a dual-color target barcode with an inappropriate combination of color light (e.g. incident illumination I of white light having all visible color wavelengths), each of the color sections of the dual-color target barcode can provide a similar degree (e.g. intensity) of reflected illumination R, such that both of the color sections would be of similar brightness. In this example, ability of decoder 304 to differentiate edges between feature 113 and background 115 sections could be compromised. Accordingly, control module 230 is configured to select incident illumination I emitted from light source 105 using a selected color wavelength or plurality of selected color wavelengths, such that the respective degree (e.g. illumination brightness, also referred to as illumination intensity) of reflected illumination R from each of respective feature 113 sections and background 115 sections will be different, so that decoder 304 can more appropriately detect the edges there-between (e.g. the features 113 can be more detected more prominently in captured image data 111).

Control module 230 is also configured to receive from a decoder system 300 (see by example FIG. 3) a first analysis result 112*a* of first color image 111*a* and a second analysis result 112*b* of second color image 111*b*, first and second analysis results 112*a*,112*b* including detected edge data between feature 113 and background 115 sections, and to compare first and second analysis results 112*a*,112*b* against an analysis threshold 232 indicative of a degree of accuracy of the detected edge data between first and second analysis results 112*a*,112*b*. The control module 230 is also configured to select either first analysis result 112*a* or second analysis result 112*b* as resultant captured image data 111 based on their comparison against analysis threshold 230. For example, as further described below, the detected edge data can include edges determined from a color edge detector 320 (see FIG. 3) of decoder system 300 based on results of an edge detection algorithm applied to color boundaries of feature 113 and background 115 sections. For example, as further described below, the decoded barcode information could be obtained from a grayscale decoder 304 of decoder system 300 based on edges determined from color edge detector 320.

In an alternative embodiment, first and second analysis results 112*a*,112*b* can include decoded barcode information based on detected edges of feature 113 and background 115 sections. Therefore, control module 230 could compare first and second analysis results 112*a*,112*b* against analysis threshold 232 indicative of a degree of matching of the decoded barcode information of first and second analysis results 112*a*,112*b* against a set of standard barcode definitions, such that the decoded barcode information is based on a standardized coding scheme and analysis threshold 232 represents a matching accuracy against which each of first and second analysis results 112*a*,112*b* are compared to a particular standard code definition in the standardized coding scheme.

In yet another alternative embodiment, control module 230 could compare first and second analysis results 112*a*,112*b* against analysis threshold 232 indicative of an embedded error correction mechanism, for example a check sum or an error-correcting code, contained in the barcode information. In other words, the detected edges of feature 113 and background 115 sections are compared by control module 230 against an expected checksum or other error correction value used as analysis threshold 232, in order to determine if the image quality of captured image data 111*a*,111*b* is satisfactory for barcode reading purposes.

Figure 4:
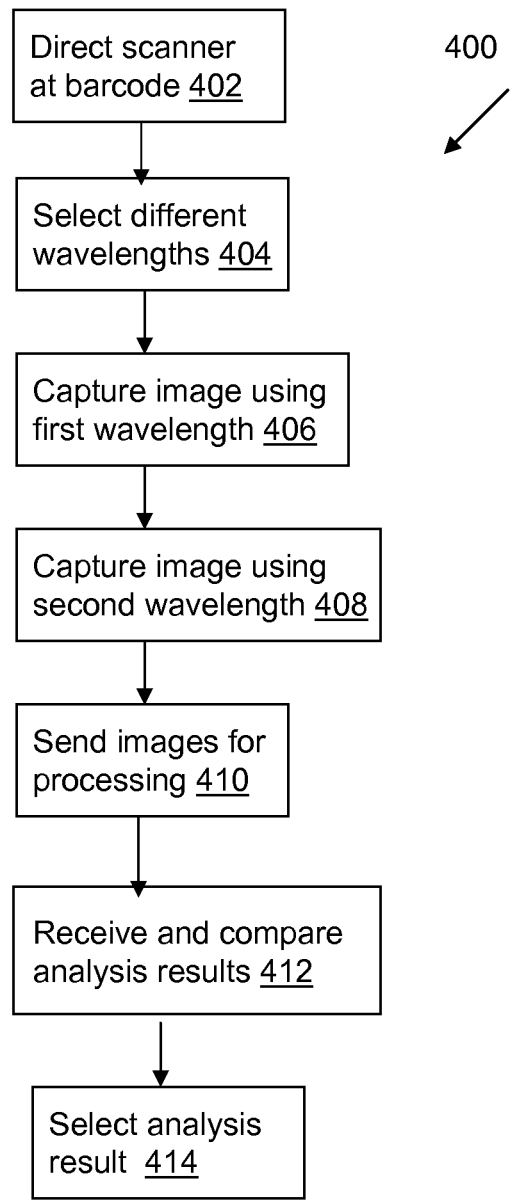

In general operation 400 of barcode scanner 102, referring to FIG. 3 and FIG. 4, at step 402 user directs barcode scanner 102 towards barcode 101 having a plurality of feature sections 113 in a first color and a plurality of background sections 115 in a second color. At step 404, control module 230 selects a first color wavelength and a second color wavelength from a plurality of independently selectable color wavelengths for use as incident illumination I, such that the second color wavelength is different from the first color wavelength. At step 406, control module 230 directs light source 105 to provide incident illumination I onto target barcode 101 during reading of target barcode 101 using the first color wavelength, such that photodetector 107 receives at least a portion of incident illumination I when reflected off target barcode 101 as reflected illumination R, reflected illumination R used by photodetector 107 to capture a first color image 111*a* of target barcode 101 when the first color wavelength is selected as incident illumination I. At step 408, control module 230 directs light source 105 to provide incident illumination I onto target barcode 101 during reading of target barcode 101 using the second color wavelength, such that photodetector 107 receives at least a portion of incident illumination I when reflected off target barcode 101 as reflected illumination R, reflected illumination R used by photodetector 107 to capture a second color image 111*b* of target barcode 101 when the second color wavelength is selected as incident illumination I.

At step 410, first color image 111*a* and second color image 111*b* are sent to decoder system 300 for image processing. At step 412, control module 230 receives from decoder system 300 a first analysis result 112*a* of first color image 111*a* and a second analysis result 112*b* of second color image 111*b* and compares analysis results 112*a*,112*b* against analysis threshold 232.

At step 414, based on the comparison, control module 230 could in the case where first and second analysis results 112*a*,112*b* included detected edge data of the sections 113, 115, the comparison of first and second analysis results 112*a*, 112*b* would be indicative of a degree of accuracy of the detected edge data between first and second analysis results 112*a*,112*b* and therefore select either first analysis result 112*a* or second analysis result 112*b* as resultant captured image data 111, such that the selected analysis result from the comparison is determined to be the best image for recognition of edges between feature and background 113,115 sections. Alternatively at step 414, in the case where first and second analysis results 112*a*,112*b* included decoded barcode information based on detected edges of the sections 113,115, the comparison of first and second analysis results 112*a*,112*b* would be indicative of a degree of accuracy of the decoded barcode information between first and second analysis results 112*a*,112*b* and therefore select either first analysis result 112*a* or second analysis result 112*b* as resultant captured image data 111. Alternatively at step 414, in the case where first and second analysis results 112*a*,112*b* included decoded barcode information based on detected edges of the sections 113,115, the comparison of first and second analysis results 112*a*,112*b* would be indicative of a degree of accuracy of the decoded barcode information between first and second analysis results 112*a*,112*b* and therefore combine determined correct portions of first analysis result 112*a* and second analysis result 112*b* to generate as a combination the resultant captured image data 111.

In yet another alternative embodiment, control module 230 can compare different analyses against the same or different types of analysis threshold 232 of different sets of captured image data 111 representative of barcode 101 using respective differing selected color wavelengths of incident illumination I emitted from light source 105. In this embodiment, control module 230 can compare results from different sets of captured image data 111*a,b*, based on the use of different selected color wavelengths of incident illumination I during image capture, and then decide on the best captured image data 111*a,b* from the sets of captured image data. For example, a first selected color wavelength of incident illumination I produces a first set of captured image data 111*a* with a detected error (e.g. absence of error checksum) when compared against analysis threshold 232, while a second selected color wavelength of incident illumination I produces a second set of captured image data 111*b* without a detected error (e.g. detected presence of error checksum) when compared against analysis threshold 232. In this case, second set of captured image data 111*b* obtained via the second selected color wavelength of incident illumination I would be selected by control module 230 as the best analysis result. Alternatively, in the case where every set of captured image data 111*a,b*, when compared against analysis threshold 232, is determined to contain one or more errors, control module 230 can select as the analysis result the set of captured image data 111*a,b* having the least number of errors. Further, in the case where all sets of captured image data 111*a,b* fails their comparison against analysis threshold 232, a combination of different sets of captured image data 111*a,b* can, nevertheless, produce a satisfactory analysis result, for example in some cases when all sets of captured image data 111*a,b* fail in their comparison against analysis threshold 232, certain features (e.g. image portions) of individual captured image data 111*a,b* can be combined (e.g. stitched together) to deliver an acceptable analysis result.

It is recognized that analysis threshold 232 can be of the same or different threshold type for each of the captured image data 111*a,b*. for example, analysis threshold 232 can be of type such as but not limited to: verify checksums (error corrections); cross-compare results on different levels (codeword level, translation table level, control characters interpretation level); consult host database on data validity; and/or use well-known code interpretation schemes.

One example of a standardized coding interpretation scheme for barcodes is UPC (Universal Product Code) barcode. The numbers and/or letters (e.g. ASCII—American Standard Code for Information Interchange) stored in the barcode are unique identifiers representing the particular standard code defined in the standardized coding scheme that, when read, can be used by a computer to look up additional information about the item associated with the barcode. For example, the price and description of the item is generally not stored in the barcode. The data is read from the barcode, sent to a computer, and the computer looks up the price and description of the item from the computer's database.

Referring now to FIG. 3, a block diagram is shown of decoder system 300 for decoding information from target barcode 101 using a greyscale barcode decoder 304. Each of the blocks of system 300 represents a functional block of system 300 and can be implemented in either hardware or software, and can be implemented, either in whole or in part, in bar code scanner 102. Functional blocks of decoder system 300 can also be implemented in software executing on processor 202 of computing device 100.

As described above, color image sensor 220 captures an image of target barcode 101 from light reflected from target barcode 101 and captured by sensor elements of color image sensor 220. Target barcode 101 can be either color, or black and white. Color target barcodes 101 can have features and background in colors with similar brightness. Color image sensor 220 provides color image values 306 to image converter 310. Color image values 306 output from color image sensor 220 can be in any number of formats that include, but are not limited to, RGB, YUV, raw Bayer filter format, or other formats noted above. Color image values 306 can comprise an array, vector, matrix and/or a data stream of values representing the color space data for each pixel captured by color image sensor 220.

Image converter 310 converts color image values 306 of the captured image of target barcode 101 to output luminosity values and chrominance values. In an embodiment where color image sensor 220 provides RGB format color image values 306, image converter 310 can perform an RGB format to YUV format conversion to generate YUV values representing the captured image of target barcode 101. Various suitable methods for converting RGB format image values to YUV format image values will be apparent to those skilled in the art. The luminosity value can be calculated as a weighted sum of each of the red, green, and blue components of each pixel. As described above with respect to the YUV model, chrominance values are calculated as color difference values that are computed as scaled differences between the luminosity value and the blue and red values for each pixel. If color image values 306 are in another format, image converter 310 can convert color image values to RGB format values prior to converting to luminosity values and chrominance values, or image converter 310 converts color image values 306 from their native format directly to luminosity values and chrominance values.

Color image sensor 220 can also provide raw Bayer filter format color image values 306 to image converter 310. Accordingly, in such an embodiment, image converter 310 is configured to obtain pixel color information from the Bayer filter format to RGB color model format as will be understood by a person skilled in the art. Once the RGB color model format image values are obtained, the values can be converted to YUV image format values.

Luminosity value extractor 312 and chrominance value extractor 314 extract luminosity values 316 and chrominance values 318, respectively, for each pixel. Luminosity value extractor 312 can extract the Y values from the YUV image format values to provide luminosity values 316 for each pixel in order to provide a greyscale image based on the captured color image. The greyscale image, represented by luminosity values 316, is then provided to greyscale barcode decoder 304 to decode the information from target barcode 101.

If target barcode 101 uses a black and white or greyscale to represent the features and background of target barcode 101, greyscale barcode decoder 304 can likely decode information in target barcode 101. However, if target barcode 101 is uses a color representation that uses colors with similar luminosity (brightness) values, the luminosity values may not be sufficient to decode the information from the features of target barcode 101. For example, yellow can nearly be as bright as white, such that if target barcode 101 was implemented using yellow colored features on a white background, the greyscale image comprised of luminosity values 316 would obscure the features and background of target barcode 101. In these cases, luminosity values 316 alone are insufficient to decode information from target barcode 101 and chrominance values 318 from chrominance value extractor 314 are used.

Chrominance value extractor 314 can extract the blue difference components and red difference components (i.e. the U and V values) from the YUV image format values to provide chrominance values 318 for each pixel. Chrominance values 318 can be provided as only a single color difference component (i.e. either the U or V value for each pixel) or a combination of color difference components. The combination of the color difference components can use a weighted sum or difference of the U and V components. The weighting of the components in the combination can be based on information about color image values 306 of the captured image, such as color temperature.

Color temperature information can be used to distinguish image features from the background. Chrominance value extractor 314 can provide chrominance values 318 for each pixel by applying the equation: $f(U,V)$=constant, where the function $f$ is parallel to a color temperature gradient on a UV color chart. The form of function $f$ may be chosen for computational efficiency. For example, function $f$ can be selected as U-rV, where r is a constant that can be chosen and adjusted from image samples. When function $f$ is selected as U-rV, the resultant chrominance values 318 thus have a reduced red difference component (i.e. V value) according to the color temperature of the image. Thus, the color difference between features and the background of target barcode 101 can be emphasized. Chrominance values 318 provides a color differential image that reveals color space differences in the captured image.

The value of r is selected so that U-rV=constant is a line that corresponds to a color temperature isotherm line in a UV color space chart, such as the CIE 1960 color space, where the color temperature isotherm is perpendicular to the color temperature gradient. For computational simplicity, the color temperature gradient is approximated as a line in order to determine r for the U-rV=constant line that is perpendicular to the color temperature gradient.

As the algorithm of chrominance value extractor 314 processes images, r can be adjusted to achieve better performance. For warmer (reddish) images, r can be adjusted lower, and for colder (bluish) images, r can be adjusted higher. Captured images can be preprocessed using picture samples to adjust r for future scans. An r value equal to 1 corresponds to a color temperature of ~6500K, where ~5500K corresponds to the color temperature of sun light.

Chrominance values 318 are then provided to color edge detector 320 that determines color boundaries of the features of the target barcode 101 to generate edge values 322. Color edge detector 320 applies an edge detection algorithm to the chrominance values 318 in order to detect the color difference gradient between the features and background of target barcode 101. Any number of edge detection algorithms can be used, including, but not limited to, thresholding using a dynamic or static threshold, first and second order differential techniques, median, and thinning. Thresholding techniques may be preferable for simplicity and speed of execution.

Edge values 322 provided by color edge detector 320 define a vector image of target barcode 101 that defines the edges of features of target barcode 101. Edge values 322 can be combined with luminosity values 316 to provide pixel values to greyscale barcode decoder 304 in order to decode the information from target barcode 101. Alternatively, greyscale barcode decoder 304 may be provided with the edge values 322 to decode information from target barcode 101.

In yet another alternative, edge values 322 and luminosity values 316 can be combined by greyscale barcode decoder 304 as required to decode information in target barcode 101. For example, greyscale barcode decoder 304 can apply the edge values 322 to the greyscale image defined by the luminosity values 316 to correct the captured image in order to decode information in target barcode 101. That is, greyscale barcode decoder 304 is configured to combine the received signals (e.g. luminosity values 316 and edge values 322) received from the image converter 310 and color edge detector 320 into a series of characters that represent the information encoded in target barcode 101.

Greyscale barcode decoder 304 can comprise any suitable combination of software, firmware and hardware for implementing greyscale decoding that is based on processing grey scale images. Greyscale barcode decoder 304 can comprise any suitable standard barcode decoder adapted for use with greyscale images as will be understood by a person skilled in the art.

As will now be apparent based on the discussion above, computing device 100 uses color image sensor 220 to capture an image of target barcode 101 to acquire color image values 306 representing target barcode 101. These color image values 306 are then processed by image converter 310 and color edge detector 320 to obtain luminosity values 316 representing a greyscale image that is combined with edge values 322 from color edge detector 320, where the resulting combined values can be processed in a substantially conventional manner by any suitable greyscale barcode decoder 304. By converting the color image values 306 to a representation that can be processed by a greyscale barcode decoder, the need for a computationally expensive and/or difficult to implement color barcode decoder is eliminated, and color barcodes where the features and background have a similar brightness can be decoded.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A barcode scanner device for reading a target barcode having a plurality of feature sections in a first color and a plurality of background sections in a second color, the device comprising:
a light source for providing incident illumination onto the target barcode during reading of the target barcode, the light source having a plurality of independently selectable color wavelengths;
a photodetector for receiving at least a portion of the incident illumination when reflected off the target barcode as reflected illumination, the reflected illumination used by the photodetector to capture a first color image of the target barcode when a first color wavelength is selected as the incident illumination and to capture a second color image of the target barcode when a second color wavelength is selected as the incident illumination;
a memory for storing program code;
a processor coupled to the memory that executes the program code to configure the processor to:
select the first color wavelength and the second color wavelength from the plurality of independently selectable color wavelengths for use as the incident illumination, such that the second color wavelength is different from the first color wavelength,
receive from a decoder system a first analysis result of the first color image and a second analysis result of the second color image, the first and second analysis results including decoded barcode information based on detected edges of the sections,
compare the first and second analysis results against an analysis threshold indicative of a degree of accuracy of the decoded barcode information between the first and second analysis results, and
combine portions of the first analysis result and the second analysis result to generate the captured image data based on their comparison against the analysis threshold,
wherein the decoder system processes the first color image to generate the first analysis and processes the second color image to generate the second analysis.

2. The device of claim 1, wherein the light source includes a plurality of different lights for providing the plurality of independently selectable color wavelengths.

3. The device of claim 2, wherein the first color wavelength is a combination of color wavelengths and the second color wavelength is a single wavelength.

4. The device of claim 3, wherein the second color wavelength is included in the combination of color wavelengths of the first color wavelength.

5. The device of claim 1, wherein plurality of independently selectable color wavelengths includes a wavelength selected from the group consisting of: visible light; infrared light; and ultraviolet light.

6. The device of claim 1, wherein the detected edges of the section include edges determined from a color edge detector of the decoder system based on results of an edge detection algorithm applied to color boundaries of the sections.

7. The device of claim 1, wherein the decoded barcode information obtained from a grayscale decoder of the decoder system is based on edges determined from a color edge detector using an edge detection algorithm applied to color boundaries of the sections.

8. A method for reading a target barcode having a plurality of feature sections in a first color and a plurality of background sections in a second color, the method comprising:
selecting a first color wavelength and a second color wavelength from a plurality of independently selectable color wavelengths for use as incident illumination, such that the second color wavelength is different from the first color wavelength;
directing incident illumination onto the target barcode during reading of the target barcode using the first color wavelength to capture using a photodetector a first color image of the target barcode;
directing incident illumination onto the target barcode during reading of the target barcode using the second color wavelength to capture using the photodetector a second color image of the target barcode;
sending the first color image and the second color image to decoder system for image processing; and
receiving from the decoder system a first analysis result of the first color image and a second analysis result of the second color image and comparing the analysis results against an analysis threshold in order to determine a resultant captured image data,
wherein the first and second analysis results include decoded barcode information based on detected edges of the sections and the comparison is indicative of a degree of accuracy of the decoded barcode information between the first and second analysis results, such that portions of the first analysis result and the second analysis result are combined to generate the resultant captured image data based on their comparison against the analysis threshold.

9. The method of claim 8, wherein the plurality of independently selectable color wavelengths are provided by a light source comprising a plurality of different lights.

10. The method of claim 8, wherein the first color wavelength is a combination of color wavelengths and the second color wavelength is a single wavelength.

11. The method of claim 8, wherein the second color wavelength is included in the combination of color wavelengths of the first color wavelength.

12. The method of claim 8, wherein plurality of independently selectable color wavelengths includes a wavelength selected from the group consisting of: visible light; infrared light; and ultraviolet light.

13. The method of claim 8, wherein the detected edges of the section include edges determined from a color edge detector of the decoder system based on results of an edge detection algorithm applied to color boundaries of the sections.

14. The method of claim 8, wherein the decoded barcode information obtained from a grayscale decoder of the decoder system is based on edges determined from a color edge detector using an edge detection algorithm applied to color boundaries of the sections.

* * * * *